United States Patent
Yoshida et al.

(10) Patent No.: US 6,449,378 B1
(45) Date of Patent: Sep. 10, 2002

(54) DATA PROCESSING APPARATUS AND METHOD AND STORAGE MEDIUM

(75) Inventors: Jun Yoshida, Kawasaki; Kenichi Nagasawa; Keiichi Iwamura, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/235,390

(22) Filed: Jan. 22, 1999

(30) Foreign Application Priority Data

Jan. 30, 1998 (JP) .......................................... 10-018666

(51) Int. Cl.⁷ ................................................ G06K 9/00
(52) U.S. Cl. ..................................................... 382/100
(58) Field of Search ................................ 382/100, 232, 382/235, 236, 276, 280, 282; 713/168, 176, 179, 180; 340/825.34

(56) References Cited

U.S. PATENT DOCUMENTS

| | | | |
|---|---|---|---|
| 5,636,292 A | | 6/1997 | Rhoads ........................ 382/232 |
| 5,778,102 A | * | 7/1998 | Sandford, II et al. ........ 382/251 |
| 5,809,139 A | * | 9/1998 | Girod et al. ................. 380/202 |
| 5,983,176 A | * | 11/1999 | Hoffert et al. ............... 704/233 |
| 6,037,984 A | * | 3/2000 | Isnardi et al. ................ 348/403 |
| 6,131,161 A | * | 10/2000 | Linnartz ....................... 713/176 |
| 6,185,312 B1 | * | 2/2001 | Nakamura et al. ........... 382/100 |
| 6,188,728 B1 | * | 2/2001 | Hurst ..................... 375/240.16 |
| 6,226,387 B1 | * | 5/2001 | Tewfik et al. ................ 382/100 |

FOREIGN PATENT DOCUMENTS

| | | | |
|---|---|---|---|
| WO | WO 97/13248 | 4/1997 | ........... G11B/20/00 |
| WO | WO 97/43853 | 11/1997 | ........... H04N/5/913 |
| WO | WO 98/31152 | 7/1998 | ............ H04N/7/50 |

OTHER PUBLICATIONS

Chiou–Tung Hzu, et al., "Digital watermarking for video". Digital Signal Processing Proceedings, 13th International Conference, IEEE Jul. 2–4, 1997., vol. 1, pp. 217–220.

Eiji Okamoto, "Introduction to Encryption Theory", Kyoritsu Shuppan K.K, pp. 33–51 & pp. 88–99, (1993).

Nikkei Electronics, (No. 694), pp. 83–102, Jul. 14, 1997.

Junji Ohnishi, Kazuhiro Oka & Kineo Matsui, "A watermarking scheme to image data by PN sequence", The 1997 Symposium on Cryptography and Information Security, SCIS 97–26B, Jan. 29–Feb. 1, 1997.

Ingemar J. Cox, Joe Killian, Tom Leighton and Talal Shamoon, "A Secure, Robust Watermark for Multimedia," Information Hiding, pp. 185–206 (1996).

Hirokazu Ishizuka, Yasuyuki Sakai & Kouichi Sakurai, "On an experimental evaluation of steganography with wavelet transform", The 1997 Symposium on Cryptography and Information Security, SCIS 97–26D, Jan. 29–Feb. 1, 1997.

\* cited by examiner

Primary Examiner—Andrew W. Johns
Assistant Examiner—Shervin Nakhjavan
(74) Attorney, Agent, or Firm—Fitzpatrick, Cella, Harper & Scinto

(57) ABSTRACT

It is an object of this invention to reliably pad electronic water-mark information even in a moving image constituted by a plurality of frames whose contents hardly change and easily pad electronic water-mark information even in a general moving image obtained by photographing an object at one angle. In order to achieve this object, there is provided an electronic water-mark information padding scheme of padding electronic water-mark information in only intraframe-encoded data without padding any electronic water-mark information in interframe-encoded data.

6 Claims, 5 Drawing Sheets

DATA PROCESSING APPARATUS AND METHOD AND STORAGE MEDIUM

BACKGROUND OF THE INVENTION

1. Field of the Invention

The present invention relates to a data processing apparatus and method of embedding or padding electronic watermark information in moving image data and a storage medium storing the method.

2. Related Background Art

As techniques of embedding electronic water-mark information in moving image data, a method of embedding electronic water-mark information in movement vectors between frames, a method of embedding electronic water-mark information by combining two types of moving images obtained by two cameras for photographing the same object at slightly different angles, and the like are known.

The principle of moving image compression in a moving image compression scheme including an intraframe encoding means and an interframe encoding means, e.g., MPEG moving image compression, will be described first. A method of embedding electronic water-mark information in movement vectors between a plurality of frames of moving image data will be described next.

In MPEG moving image compression, the redundancy in the time axis direction is reduced by calculating the difference between a plurality of frames, and the obtained difference data is subjected to the DCT (Discrete Cosine Transform) and variable-length encoding processing to reduce the redundancy in the spatial direction, thereby realizing efficient encoding as a whole. Consider the redundancy in the time axis direction. Since the correlation between consecutive frames of a moving image is high, the redundancy can be reduced by calculating the difference between a target frame to be encoded and a frame temporally preceding or succeeding the target frame.

According to this compression scheme, one of the following pictures is assigned to each frame: an intra-coded picture (I-picture) obtained by the intra-encoding mode of encoding a frame based on only the image data in the frame to be encoded; a forward predictive-coded picture (P-picture) obtained by encoding the difference value between a target frame and a frame one frame ahead of the target frame; and a bidirectional predictive-coded picture (B-picture) obtained by the difference value between a target frame and a frame temporally preceding or succeeding the target frame or the difference value between interpolated frames generated from these two frames. Each frame is encoded in accordance with this assignment result, and three types of encoded data obtained in this manner are combined with each other in a predetermined sequence. The resultant data is then output.

In MPEG, it is recommended that 1 I-picture, 4 P-picture, and 10 B-picture constitute one unit (GOP) with the I-picture being assigned at the beginning of the 15 frames, and 2 B-pictures and 1 P-picture being repeatedly assigned afterward. By assigning I-pictures to a plurality of frames in a predetermined cycle, special reproduction such as reverse reproduction or partial reproduction in units of GOPs can be performed, and error propagation can be prevented.

Assume that a given target frame to be encoded is a new image that is not related to a temporally preceding frame. In this case, the difference value between the target frame and a succeeding frame may become smaller than that between the target frame and the preceding frame. For this reason, in MPEG, bidirectional predictive encoding is performed to realize more efficient compression.

In MPEG, so-called movement compensation is performed. In this operation, the differences between macroblocks at/near the same positions in a target frame and a temporally preceding or succeeding frame in units of a predetermined number of blocks (macroblocks) consisting of 4 luminance data blocks and 2 color difference data blocks, each block serving as a processing unit in the above DCT and consisting of 8 pixels×8 pixels. By discriminating a macroblock exhibiting the minimum difference, a movement vector is detected, and the detected movement vector is output as part of encoded data.

A given macroblock is decoded as follows. Macroblock data at the same position in a temporally preceding or succeeding frame is extracted by using this movement vector, and the macroblock encoded in the above manner is decoded on the basis of this extracted data. In the above movement compensation, after a frame temporally preceding the target frame is temporarily encoded on the encoding side, a preceding frame that can be obtained by decoding the encoded frame is generated in advance on the decoding side. Then, movement compensation is performed by using macroblocks in this preceding frame and the target frame. With this operation, the target frame can be properly encoded by referring to the actual reproduced image on the decoding side.

According to the scheme of embedding electronic water-mark information in movement vectors, 1 bit of water-mark information can be embedded by changing one movement vector. When, for example, the value of 1 bit is to be set to "1", this movement vector is moved to a visually unrecognizable degree. When the above value is to be set to "0", the movement vector is not moved. This changing/unchanging processing is performed for movement vectors equal in number to the bits of water-mark information, thereby embedding one piece of water-mark information.

When electronic water-mark information is to be embedded in image data by using this method, movement vectors must always exist. It is therefore difficult to embed electronic water-mark information in a frame having an image without any movement vector, i.e., a frame having an image without any movement of the object.

The method of embedding water-mark information by combining two types of moving image data obtained by two cameras for photographing the same object at slightly different angles will be described next.

According to this method, two cameras are installed to photograph one object at slightly different angles. Since the angle defined by the two cameras with the object serving as a vertex is very small, the difference between the images obtained by the two cameras cannot be identified by the human eye.

In the following description, the two cameras will be referred to as cameras A and B. Each of the moving images obtained by the cameras A and B is divided into frames. The respective frames are represented by (a1, a2, . . . , an) and (b1, b2, . . . , bn). Frames are randomly selected from the respective moving images obtained by the cameras A and B and are combined with each other to generate an original moving image. With this operation, for example, the original moving image can be generated in the form of (a1, a2, b3, a4, b5, . . . , bn).

Subsequently, several bits constituting water-mark information are sequentially embedded one by one in each frame. More specifically, when 1 bit to be embedded in 1 frame of the original moving image, i.e., "a1", is "1", the frame "a1" of the original moving image is replaced with another frame "b1" of the moving image. When the value of this 1 bit is "0", the frame is not be replaced. By performing this processing for frames equal in number to the bits of the water-mark information, one piece of water-mark information can be embedded in the moving image data.

When the water-mark information embedded by this processing is to be extracted and decoded, the respective images (a1, a2, . . . , an) and (b1, b2, . . . , bn) obtained by the two cameras A and B are required in addition to the original moving image. Therefore, a large storage area is required. In addition, since moving images obtained by the two cameras for photographing the same object at slightly different angles are required, this method cannot be applied to an existing moving image.

As described above, according to the method of embedding electronic water-mark information in movement vectors, no electronic water-mark information can be embedded in a moving image constituted by a plurality of frames whose contents hardly change. The method of embedding electronic water-mark information by combining two types of moving images obtained by photographing the same object at different angles cannot be applied to a general moving image.

SUMMARY OF THE INVENTION

The present invention has been made to solve the above problems, and has as its object to provide a new electronic water-mark information padding scheme capable of padding electronic water-mark information in a moving image formed by a plurality of frames having little change and of padding electronic water-mark information in a general moving image obtained by photographing at a single angle.

In order to achieve the above object, according to a preferred embodiment of the present invention, there is provided an image processing apparatus using a scheme of selectively using intraframe encoding or interframe encoding as a moving image compression scheme, wherein electronic water-mark information is padded in only intraframe-encoded data.

It is another object of the present invention to provide a scheme of extracting electronic water-mark information padded by the new padding scheme.

In order to achieve the above object, according to a preferred embodiment of the present invention, there is provided an image processing apparatus using a scheme of selectively using intraframe encoding or interframe encoding as a moving image compression scheme, wherein electronic water-mark information is extracted from only intraframe-encoded data.

The above and other objects, features, and advantages of the present invention will be apparent from the following detailed description in conjunction with the accompanying drawings and the appended claims.

DETAILED DESCRIPTION OF THE PREFERRED EMBODIMENTS

The preferred embodiments of the present invention will be sequentially described below.

First Embodiment

The first embodiment of the present invention will be described below with reference to the accompanying drawings.

Figure 1:
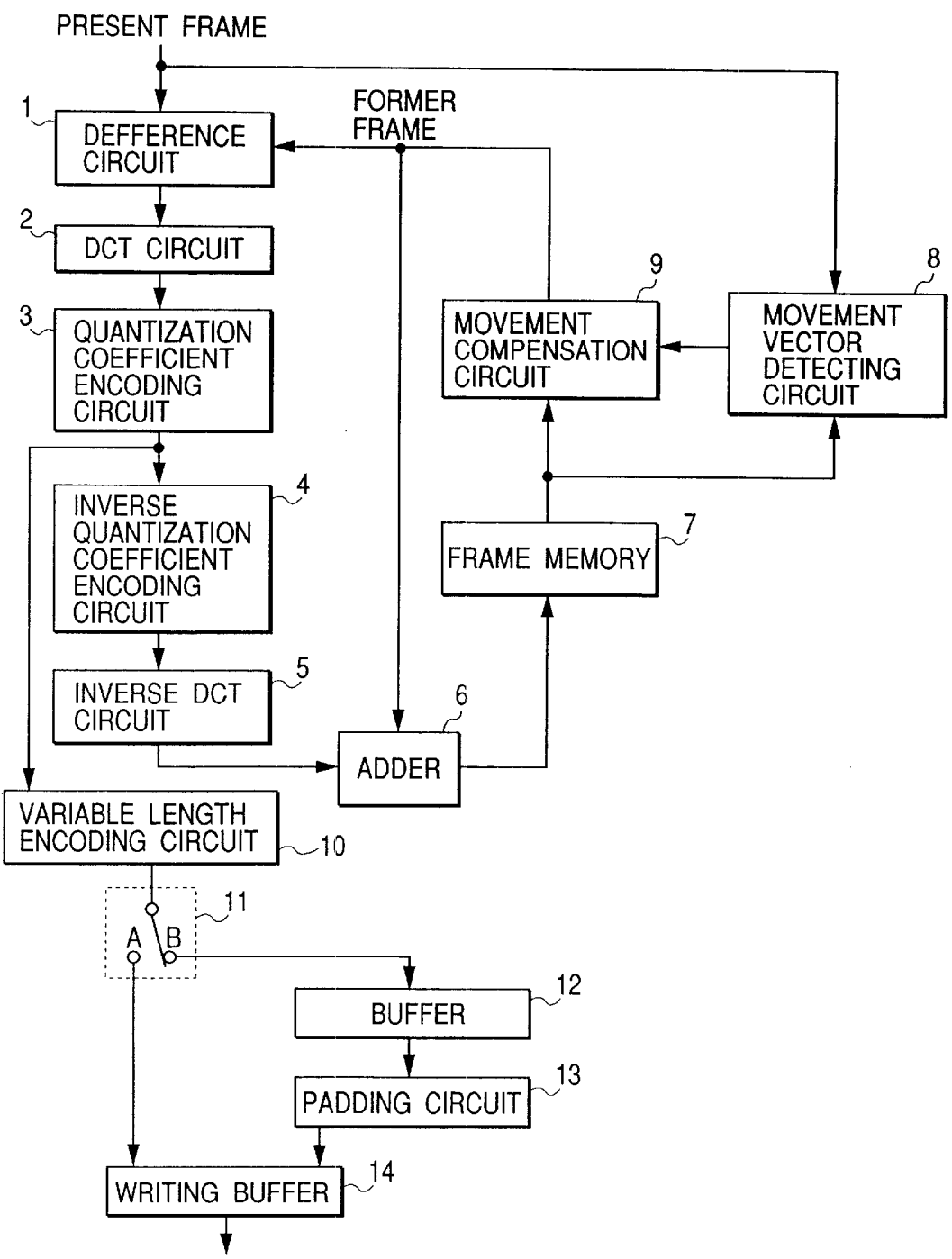
FIG. 1 is a block diagram showing an electronic water-mark information padding apparatus according to the first embodiment of the present invention.

FIG. 1 is a block diagram showing an image processing apparatus according to an embodiment of the present invention (an apparatus for embedding electronic water-mark information in compressed moving image information).

Referring to FIG. 1, this apparatus includes a difference circuit 1 for calculating the difference between image data of a present frame and image data a preceding frame having undergone movement compensation, a DCT circuit 2 for performing the discrete cosine transform for the difference value calculated by the difference circuit 1, a quantization coefficient encoding circuit 3 for reducing the data amount by quantizing the data with a variable quantization width, an inverse quantization coefficient encoding circuit 4 for inversely quantizing the output from the quantization coefficient encoding circuit 3, and an inverse DCT circuit 5 for performing transform processing inverse to that performed by the DCT circuit 2.

This apparatus also includes an adder 6 for adding the image data of the preceding frame having undergone movement compensation to the image data having undergone inverse DCT, a frame memory 7 for storing movement vector detecting circuit 8 for detecting movement vector by comparing the image data of the preceding frame with the image data of the present image data, and a movement compensation circuit 9 for performing movement compensation based on the image data of the preceding frame and the movement vector.

This apparatus further includes a variable length encoding circuit 10 for assigning quantized image data to short bit codes in descending order of occurrence frequency. Since the arrangement of this moving image information encoding circuit is known, a detailed description thereof will be omitted. The apparatus further includes a switch (selection means) 11 for selectively inputting only intraframe encoded data to the padding circuit, a buffer 12 for storing the intraframe encoded data in which electronic water-mark information is to be embedded, a padding circuit 13 for padding electronic water-mark information in the intraframe encoded data, and a writing buffer 14 for changing the sequence of transmission data to attain a constant output bit rate.

According to the basic principle of compression of moving image information, only the predicted error between a target frame to be presently compressed and sent and a frame that has been compressed and sent (preceding frame) is sent upon performing the DCT and quantization by so-called movement detection and movement compensation frame prediction instead of directly compressing and sending the image data in the target frame itself. Note that the image data of some frames of a moving image (a plurality of frames) to be intraframe-encoded are subjected to the DCT and quantization without calculation of the predicted error between the target frame and the preceding frame. In this embodiment, only image data corresponding to such frames are encoded by variable length encoding or the like, and the resultant data is input to the buffer 12 (the B side is selected) located before the padding circuit 13 through the switch 11, and the padding circuit 13 pads electronic water-mark information in the data.

After the movement of the preceding frame is detected, the difference between the image data of each of other frames encoded on the basis of interframe differences and the preceding frame is calculated on the basis of this movement detection result, and the predicted error is subjected to the DCT and quantization. The image data quantized in this manner is encoded by variable length encoding or the like, and the resultant data is input to the writing buffer 14 through the switch 11 without the mediacy of the padding circuit 13 (the A side is selected).

With the above processing, electronic water-mark information is embedded in only the image data of some frames, of the image data of all the frames representing the moving image, which are intraframe-encoded. This reduces the load on the padding circuit 13. In addition, the processing speed of the padding circuit 13 need not be very high because it suffices if embedding of electronic water-mark information in intraframe-encoded data corresponding to a given frame in the padding circuit 13 is complete before intraframe encoded data corresponding to a frame to be intraframe-encoded several frames after the given frame is input. In this case, however, in consideration of the reproduction of the moving image, final output operation or a write of data in the memory must be complete before interframe encoded data corresponding to several frames that are interframe-encoded with reference to the intraframe encoded data. For this reason, the writing buffer 14 is required to adjust the final output or write sequence of the encoded data.

According to the electronic water-mark information padding method described above, the switch 11 is used to embed electronic water-mark information in only intraframe-encoded image data after each frame is intraframe-/interframe-encoded. However, the present invention is not limited to this. If, for example, it is known in advance that given image data is subjected to intraframe encoding, electronic water-mark information may be embedded in the image data before it is input to the difference circuit 1, and the resultant image data may be encoded afterward. In this case, the function of the difference circuit 1 is preferably inserted before the difference circuit 1. In addition, the function of the switch 11 may be inserted immediately after the DCT circuit 2. With this arrangement, after only the DCT coefficients of intraframe-encoded frame are processed by the padding circuit, the resultant data is returned to the quantization coefficient encoding circuit 3, thereby embedding electronic water-mark information in the image data in the same manner as described above.

Figure 2:
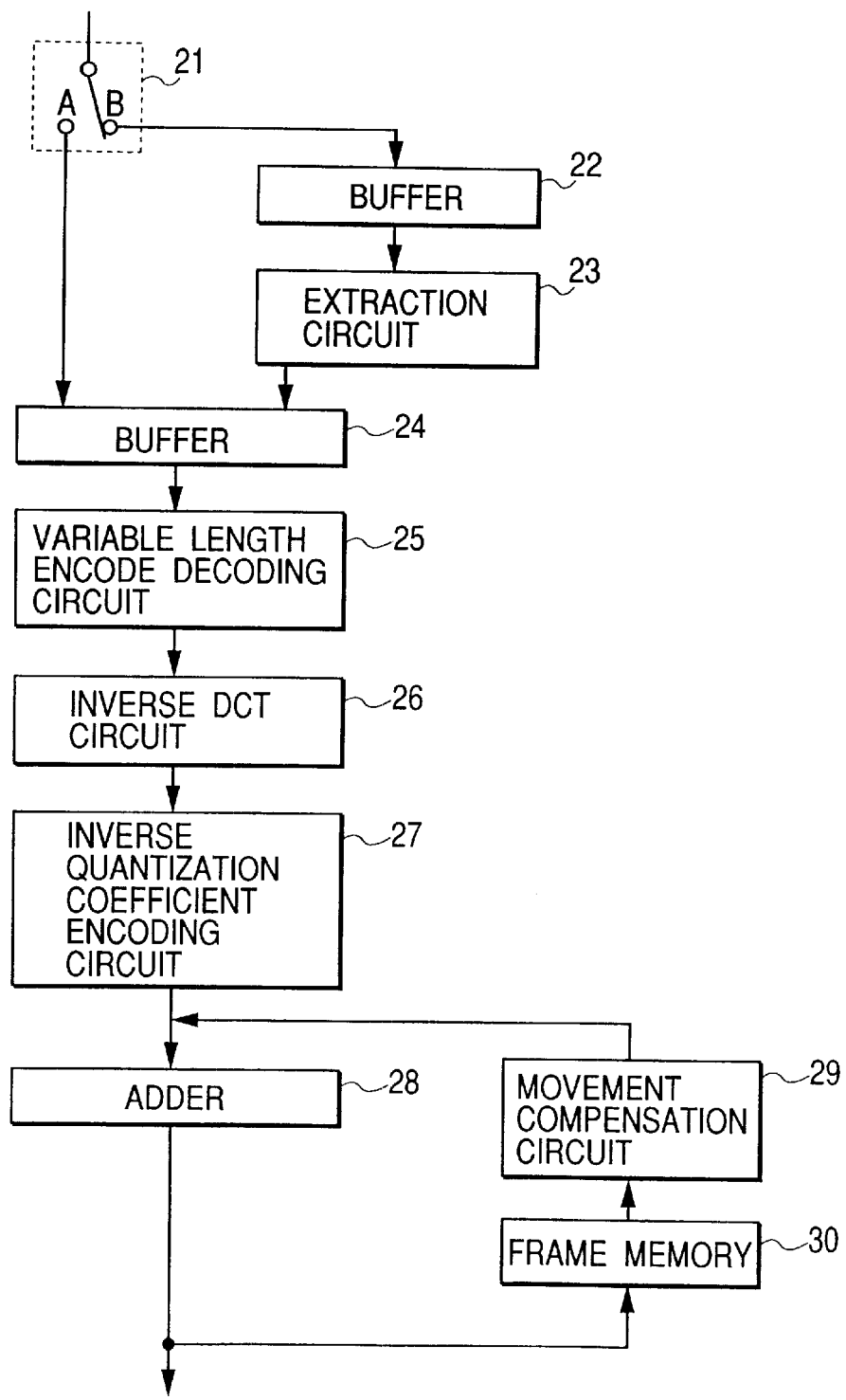
FIG. 2 is a block diagram showing an electronic water-mark information padding apparatus according to the second embodiment of the present invention.

FIG. 2 is a block diagram showing an image processing apparatus according to an embodiment of the present invention (an apparatus for extracting electronic water-mark information from compressed moving image information). FIG. 2 shows procedures for decoding moving image information in which electronic water-mark information is embedded by the arrangement shown in FIG. 1 and extracting the electronic water-mark information.

Referring to FIG. 2, this apparatus includes a switch (selection means) 21 for selectively inputting only intraframe-encoded data to an extraction circuit, a buffer 22 for storing intraframe-encoded data from which electronic water-mark information is to be extracted, an extraction circuit 23 for extracting the electronic water-mark information from the intraframe-encoded data, a buffer 24 for adjusting the sequence of compressed image data variable-length-encoded by the arrangement shown in FIG. 1, and a variable length decoding circuit 25 for decoding the compressed image data.

This apparatus also includes an inverse DCT circuit 26 for performing transform processing inverse to the DCT, an inverse quantization coefficient encoding circuit 27 for inversely quantizing the output from the inverse DCT circuit 26, an adder 28 for adding the image data of a preceding frame having undergone movement compensation to the inversely quantized image data, a movement compensation circuit 29 for performing movement compensation on the basis of the image data of the preceding frame, and a frame memory 30 for storing the image data corresponding to the preceding frame.

Assume that moving image information having electronic water-mark information embedded in only intraframe-encoded data by the arrangement in FIG. 1 is to be decoded. In this case, only when intraframe-encoded data is input, the image data is input to the buffer 22 provided for the extraction circuit 23 through the switch 21 (the B side is selected), and electronic water-mark information is extracted. In contrast to this, when interframe-encoded data is input, the image data is input to the buffer 24 through the switch 21 without the mediacy of the extraction circuit 23 (the A side is selected). With the above processing reverse to that on the electronic water-mark information embedding side, since electronic water-mark information is extracted from only image data corresponding to some frames, of the image data of all the frames representing the moving image, which are intraframe-encoded, the load on the extraction circuit can be reduced.

In addition, the processing speed of the extraction circuit 23 need not be very high because it suffices if extraction of electronic water-mark information from one intraframe-encoded data in the extraction circuit 23 is complete before the next intraframe-encoded data is input as in the case of the embedding side. Similar to the embedding side, the buffer 24 is used to adjust the sequence of encoded data such that a given frame to be intraframe-encoded is output before a frame to be interframe-encoded with reference to this given frame.

As described above, according to the image processing apparatus of this embodiment, electronic water-mark information is embedded in only intraframe-encoded data unlike the scheme of embedding electronic water-mark information in movement vectors and the scheme of combining moving images from two cameras. This apparatus can therefore be applied to a moving image that moves little and produces no moving vector and an existing moving image that does not use two moving images. In addition, many storage areas need not be prepared to store two moving images.

Second Embodiment

Figure 3:
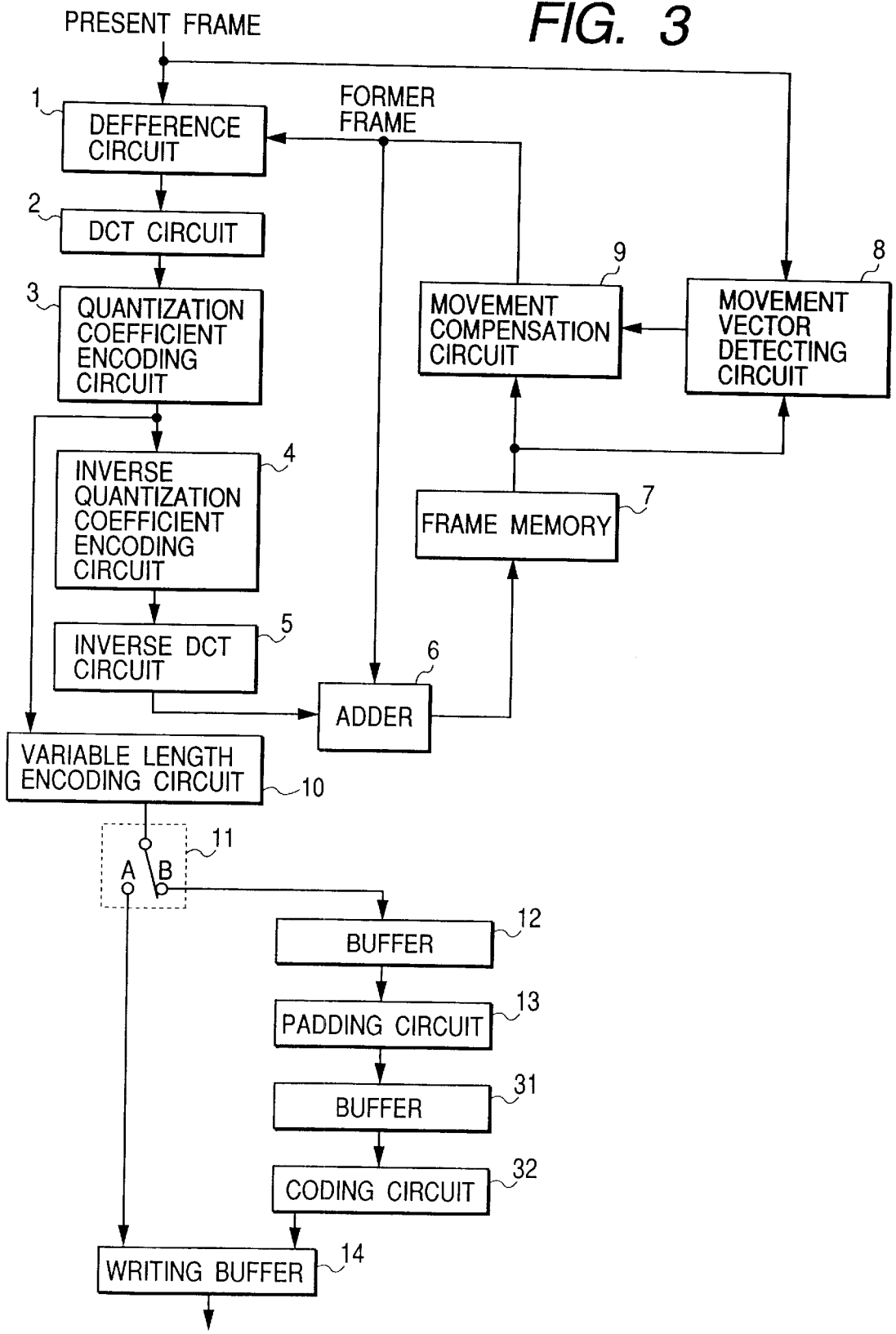
FIG. 3 is a block diagram showing the electronic water-mark information padding apparatus according to the second embodiment.
Figure 4:
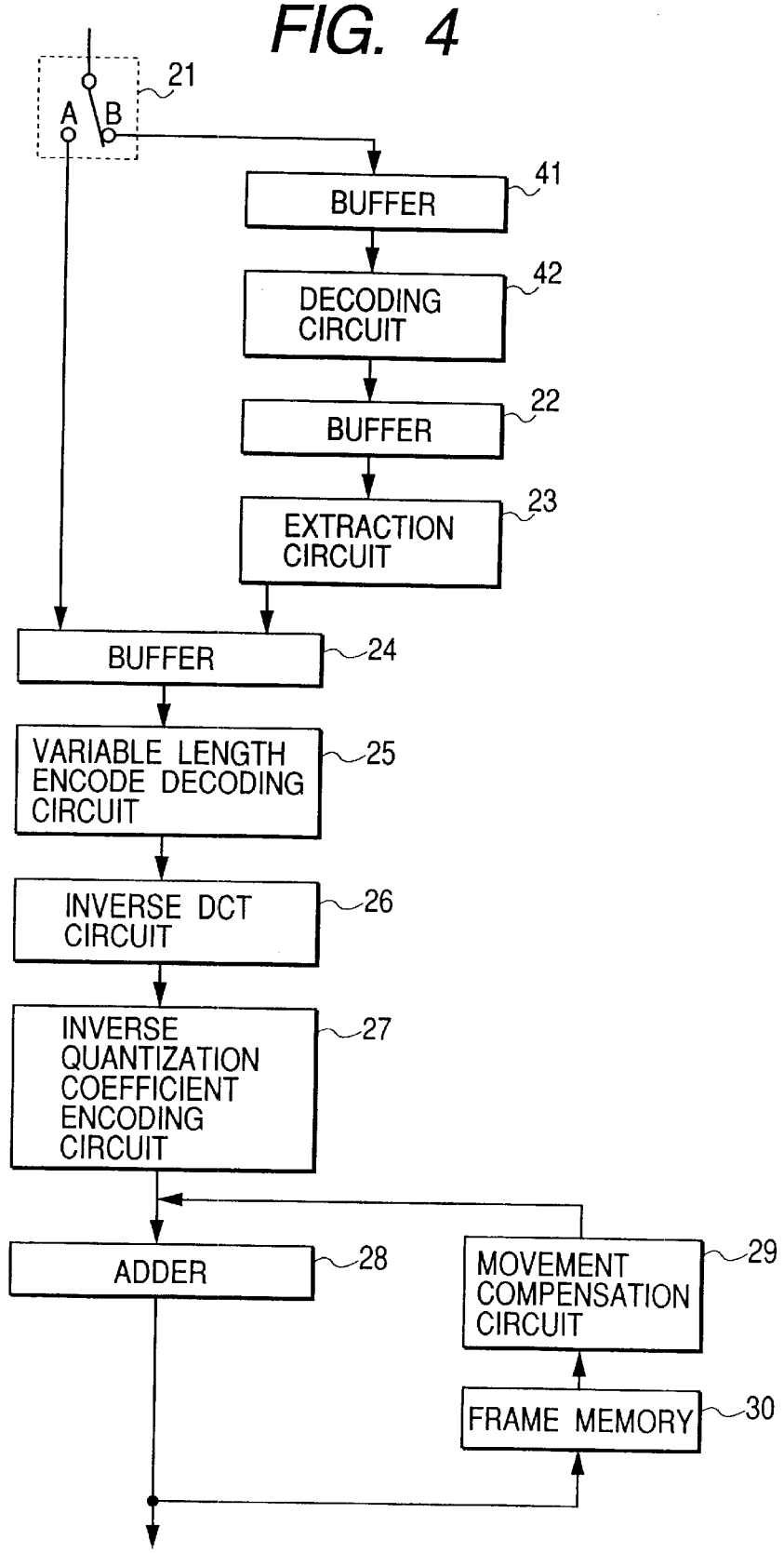
FIG. 4 is a block diagram showing the electronic water-mark information padding apparatus according to the second embodiment.

FIGS. 3 and 4 are block diagrams showing an image processing apparatus according to the second embodiment of the present invention. FIG. 3 is a block diagram showing an apparatus for encrypting data after electronic water-mark information is embedded in it. FIG. 4 is a block diagram showing an apparatus that receives output data from the apparatus in FIG. 3, decodes the data, and extracts electronic water-mark information from the data. Since the same reference numerals in FIGS. 3 and 4 denote parts having the same functions as those in FIGS. 1 and 2, a detailed description thereof will be omitted.

As shown in FIG. 3, in this embodiment, a buffer 31 and a coding circuit 32 are arranged on the subsequent stage of a buffer 12 and a padding circuit 13, and the image data decoded by the coding circuit 32 is supplied to a writing buffer 14. That is, only intraframe-encoded data in which electronic water-mark information is embedded is input to the coding circuit 32 and encrypted, thereby allowing even a coding circuit with a relatively low processing speed to keep data private without jeopardizing security in practice.

This provides highly robust copyright protection.

As shown in FIG. 4, in this embodiment, a buffer 41 and a decoding circuit 42 are arranged on the front stage of a buffer 22 and an extraction circuit 23, and the intraframe-encoded data output from the switch 21 is supplied to the extraction circuit 23 through the decoding circuit 42. That is, only intraframe-encoded data is input to the decoding circuit 42 and decoded so as to allow even a decoding circuit with a relatively low processing speed to decode data.

As an encrypting scheme that can be applied to this embodiment, a secret key cryptosystem such as DES (data encryption standard) or FEAL (fast data encipherment algorithm) or a public key cryptosystem such as RSA (for further information about each encryption scheme, see Eiji Okamoto, "Introduction to Encryption Theory", Kyoritsu Shuppan K. K) is available.

The embodiment shown in FIG. 3 has exemplified the apparatus for encrypting data after electronic water-mark information is embedded in the data. However, the coding circuit 32 may be arranged before the electronic water-mark information padding circuit 13 to embed electronic water-mark information in encrypted moving image data. The embodiment shown in FIG. 4 has exemplified the apparatus for extracting electronic water-mark information from data after the data is decoded. However, data may be decoded after electronic water-mark information is extracted therefrom. It is easy to infer that the same effect as that described above can be obtained in this case as well.

In addition, the coding circuit 32 may be connected to the output stage of the writing buffer 14 in FIG. 3. In this case, a high-speed coding circuit is required because data other than intraframe-encoded must be encrypted. However, data can be kept private without jeopardizing security in practice as in the case described above.

Third Embodiment

Figure 5:
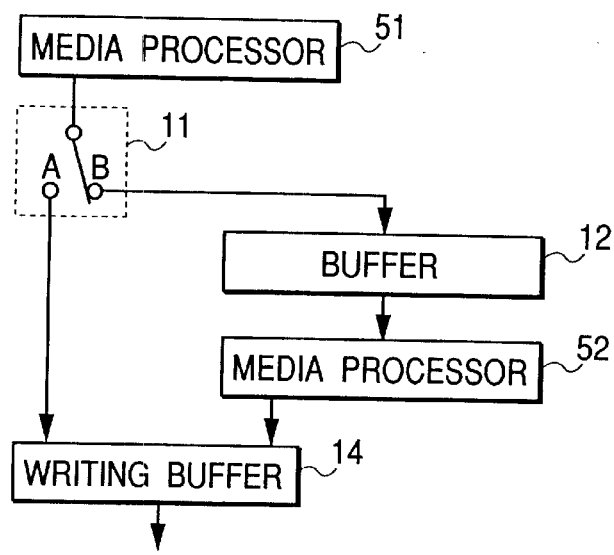
FIG. 5 is a block diagram showing an apparatus applied to the third embodiment of the present invention.

In the third embodiment shown in FIG. 5, the moving image compression circuit and electronic water-mark information padding circuit (and coding circuit) in the first and second embodiments are replaced with media processors, respectively. The same reference numerals in FIG. 5 denote the same blocks as those in FIGS. 1 and 3.

Prior to a description of the arrangement of the apparatus of this embodiment, a media processor will be described. The media processor is a programmable digital signal processor having its internal structure optimized for image processing and signal processing. The operation speed of this processor is as high as 3 to 4 BOPS (billion operations per second), and is mainly used for home information devices for image processing, e.g., MPEG compression/decoding devices, DVD players, printers, and car navigation systems at present.

The design techniques used for the media processor are roughly classified into three types of techniques:

1) Parallel processing techniques that improve the processing performance in performing the same operation. Many of these techniques use an SIMD (single instruction stream-multiple data stream) architecture to allow many arithmetic units to simultaneously operate. The same operation is executed by using a plurality of arithmetic units to improve the performance.

2) Parallel processing techniques that improve the processing performance in performing a plurality of different operations. Many of these techniques use a VLIW (very long instruction word) architecture to increase the number of instructions that can be simultaneously executed, thereby improving the performance.

3) Specifying techniques that improve the efficiency of specific operation. Some of these techniques incorporate special instructions or special arithmetic units and special circuits.

In image processing for electronic water-mark information and the like, arithmetic operation and frequency conversion such as the DCT transform are performed each pixel data, and hence the processing amount is very large. In addition, concurrent arithmetic operations must be repeatedly executed. As a processor for performing such image processing, an SIMD type media processor designed to concurrently execute the same instruction for each data is especially effective.

Although the SIMD type media processor is especially effective in this case, this does not deny the effectiveness of other two types of media processors, and the same effect can be expected with the other types of media processors. The use of a media processor for encryption and decryption processing is effective as in the case of image processing because the contents of the processing are mainly associated with the same operation and inversion for each bit.

The arrangement shown in the block diagram of FIG. 5 will be described next. Referring to FIG. 5, a media processor 51 inserted on the input stage of a switch 11 compresses moving image data. A media processor 52 inserted on the subsequent stage of a buffer 12 serving as the output stage of the switch 11 performs electronic water-mark information embedding (and encryption processing). The media processor for performing moving image compression processing is currently available (for further information about this processor, see NIKKEI ELECTRONICS No. 694, 1997. 7. 14, pp. 83–102).

As described above, the media processor is programmable, and hence can easily cope with changes in moving image compression scheme, encryption, electronic water-mark information embedding method, and the like. In addition, the high-speed processing performance of this media leads to an increase in the overall processing speed of the apparatus. Furthermore, if the processing speed is sufficiently high, the buffer 12 on the input stage of the media processor 52 in FIG. 5 can be omitted. Moreover, since the components for moving image compression processing in the second embodiment are integrated into one circuit (media processor 51), and the components for electronic water-mark information embedding and encryption processing are integrated into one circuit (media processor 52), the apparatus can be simplified and reduced in cost.

Fourth Embodiment

Figure 6:
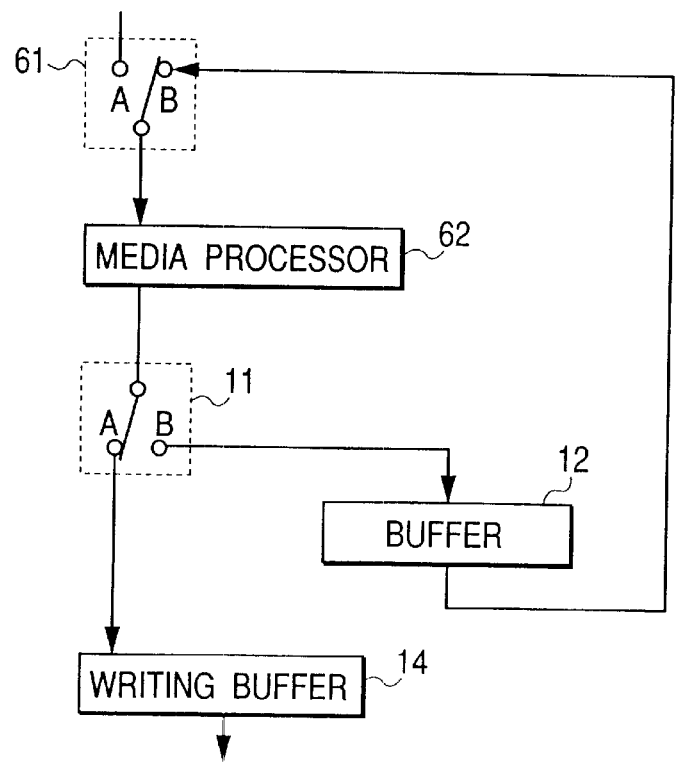
FIG. 6 is a block diagram showing an apparatus applied to the fourth embodiment of the present invention.

In the fourth embodiment shown in FIG. 6, a media processor is used in place of both the moving image compression circuit and the electronic water-mark padding circuit (and the coding circuit) in the first and second embodiments. The same reference numerals in FIG. 6 denote the same blocks as in FIGS. 1 and 3.

Referring to FIG. 6, the processing performed by the media processors 51 and 52 in FIG. 5 is performed by one media processor 62. A buffer 12 also serves as a delay circuit for correcting any time offset. A switch 61 selects the image data input to the A side or the image data input from the buffer 12 to the B side, and supplies it to the media processor 62. More specifically, the switch 61 selects the A side when moving image compression is to be performed by the media processor 62, and selects the B side when electronic water-mark information embedding (and encryption) is to be performed with respect to intraframe-encoded image data.

If an arrangement for moving image compression processing, electronic water-mark information embedding processing, and encryption processing is integrated into one circuit (media processor 62) as in this embodiment, further reductions in the size and cost of the apparatus can be attained. In addition, if a plurality of media processors are connected in parallel and controlled integrally, a further increase in operation speed can be attained.

Although the third and fourth embodiments have exemplified only the arrangements for performing moving image compression processing, electronic water-mark information embedding processing, and encryption processing, at least one or all of moving image decoding processing, electronic water-mark information extraction processing, and decryption processing can be performed by a media processor.

Other Embodiments

An electronic water-mark padding circuit that can be applied to the present invention will be described below. A typical example of this circuit is a circuit for performing frequency conversion of an input image by the fast Fourier transform, discrete cosine transform, wavelet transform, or the like, adding water-mark information to the information in the frequency domain, and embedding the information by inverse frequency conversion.

For example, in the method based on the fast Fourier transform, PN sequence information is added to an input image, the image is divided into blocks, the Fourier transform is performed in units of blocks, and 1-bit water-mark information is embedded in one block. The block in which the water-mark information is embedded is subjected to the inverse Fourier transform, and PN sequence information identical to the first PN sequence information is added to the resultant data, thereby obtaining a synthetic image. This method is described in Onishi, Oka, & Matsui, "Water-mark Signature Method for Image with PN Sequences", Proceedings of 1997 Encryption and Information Security Symposium, SCIS97-26B.

In the method based on the discrete cosine transform, after PN sequence information is added to an input image, the image is divided into blocks, and the discrete cosine transform is executed in units of blocks. After 1-bit information is embedded in one block, the resultant data is inversely transformed, and PN sequence information is added again to the data, thereby generating a synthetic image. This method is described in Cox, Kilian, Leighton, & Shamoon, "A Secure, Robust Watermark for Multimedia", Information Hiding, pp. 185-206, 1996.

According to the method based on the wavelet transform, an input image need not be divided into blocks. This method is described in Ishizuka, Sakai, & Sakurai, "Experimental Study on Security and Reliability of Electronic Watermarking Technique Using Wavelet Transform", Proceedings of 1997 Encryption and Information Security Symposium, SCIS97-26D. In addition, a method of embedding electronic water-mark information in data by arithmetic processing for the hue, brightness, or the like of pixels (U.S. Pat. No. 5,636,292 to Digimarc, and the like).

Actual implementation means of the present invention will be described next. As described in each embodiment, according to the present invention, the apparatus for electronic water-mark information embedding (and encryption) and the apparatus for electronic water-mark information extraction (and decoding) may be independently formed or may be integrated into one apparatus. That is, the present invention may be applied to either a system constituted by a plurality of devices (e.g., a host computer, an interface device, a reader, a printer, and the like), or an apparatus consisting of a single device (e.g., a DVD player or car navigation system).

The objects of the present invention are also achieved by supplying a program code of software that can realize the functions of the above embodiments to the computer (CPU or MPU) in the system or apparatus, and making the computer in the system or apparatus connected to the respective devices operate the devices in accordance with the program code.

In this case, since the program code itself realizes the functions of the above embodiments, the program code itself and a means for supplying the program code to the computer, and more specifically, a storage medium storing the program code constitute the present invention. As the storage medium for supplying the program code, for example, a floppy disk, hard disk, optical disk, magneto-optical disk, CD-ROM, CD-R, magnetic tape, nonvolatile memory card, ROM, and the like may be used.

This program code constitutes the present invention not only in a case in which the functions of the above embodiments are realized by making the computer control the respective devices in accordance with only the supplied program code but also in a case in which the functions are realized by the program code in cooperation with an OS (operating system) running on the computer, another application software, or the like.

Furthermore, the present invention includes a case in which this supplied program code is stored in a memory in a function extension board of the computer or a function extension unit connected to the computer, and some or all of actual processing operations are executed by a CPU or the like arranged in the function extension board or function extension unit on the basis of the instructions of the program code, thereby realizing the functions of the above embodiments.

According to the present invention, as described above, in the image processing apparatus for compressing the frames representing a moving image by selectively using intraframe encoding and interframe encoding, electronic water-mark information is embedded in only image data (encoded data) representing a frame to be intraframe-encoded. This apparatus can therefore be applied to a moving image exhibiting a small difference between frames or an existing moving image to embed electronic water-mark information in image data. Since image data (encoded data) representing frames to be intraframe-encoded are discretely present in a plurality of frames representing a moving image, the speed at which electronic water-mark information is embedded in these frames while they are encoded need not be very high. This apparatus can therefore be provided at a low cost.

The present invention can be variously modified within the scope of the following claims.

What is claimed is:

1. An image processing method, comprising the steps of:
   an encoding step of encoding image data constituting a moving image, by selectively using intraframe encoding or interframe encoding, wherein said encoding step performs at least frequency conversion processing and variable-length encoding; and
   an embedding step of embedding a digital watermark in only the image data to be intraframe-encoded, the embedding being performed before the frequency processing is performed in the encoding step,
   wherein, the digital watermark is not embedded in the image data to be interframe-encoded.

2. A method according to claim 1 further comprising an encrypting step of encrypting the image data encoded by intraframe encoding.

3. An image processing method, comprising the steps of:
   an encoding step of encoding image data constituting a moving image, by selectively using intraframe encoding or interframe encoding, wherein said encoding step performs at least frequency conversion processing and variable-length encoding processing; and
   an embedding step of embedding a digital watermark in only the image data to be intraframe encoded, the embedding being performed during the encoding step in image data which has been subjected to the frequency conversion processing but which has not yet been subjected to the variable-length encoding processing,
   wherein the digital watermark is not embedded in the image data to be interframe-encoded, and
   wherein, the encoding in the encoding step and the embedding in the embedding step are executed without inverse variable-length encoding into each image data constituting the moving image.

4. A method according to claim 3 further comprising an encrypting step of encrypting the image data encoded by intraframe encoding.

5. An image processing apparatus, comprising:
   encoding means for encoding image data constituting a moving image, by selectively using intraframe encoding or interframe encoding, the encoding means performing at least frequency conversion processing and variable-length encoding processing; and
   embedding means for embedding a digital watermark in only the image data to be intraframe-encoded, the embedding being performed before frequency conversion processing is performed by the encoding means,
   wherein, the digital watermark is not embedded in the image data to be interframe-encoded.

6. An image processing apparatus, comprising:
   encoding means for encoding image data constituting a moving image, by selectively using intraframe encoding or interframe encoding, the encoding means performing at least frequency conversion processing and variable-length encoding processing; and
   embedding means for embedding a digital watermark in only the image data to be intraframe-encoded, the embedding being performed during the encoding by the encoding means in image data which has been subjected to the frequency conversion processing but which has not yet been subjected to the variable-length encoding processing,
   wherein, the digital watermark is not embedded in the image data to be interframe-encoded, and
   wherein, the encoding by the encoding means and the embedding by the embedding means are executed without inverse variable-length encoding into each image data constituting the moving image.

* * * * *